United States Patent
Kasano (10) Patent No.: US 9,939,637 B2
(45) Date of Patent: Apr. 10, 2018

(54) VIRTUAL IMAGE DISPLAY DEVICE, HEAD-UP DISPLAY SYSTEM, AND VEHICLE

(71) Applicant: Panasonic Intellectual Property Management Co., Ltd., Osaka (JP)

(72) Inventor: Masahiro Kasano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/214,655

(22) Filed: Jul. 20, 2016

(65) Prior Publication Data

US 2016/0327790 A1 Nov. 10, 2016

Related U.S. Application Data

(63) Continuation of application No. PCT/JP2015/000457, filed on Feb. 3, 2015.

(30) Foreign Application Priority Data

Mar. 27, 2014 (JP) .................................. 2014-065188

(51) Int. Cl.
*G02B 27/01* (2006.01)
*G06T 19/00* (2011.01)
(Continued)

(52) U.S. Cl.
CPC .......... *G02B 27/0101* (2013.01); *B60K 35/00* (2013.01); *G02B 27/01* (2013.01);
(Continued)

(58) Field of Classification Search
CPC ............ G02B 27/0101; G02B 27/0179; G02B 2027/0129; G02B 2027/0134;
(Continued)

(56) References Cited

U.S. PATENT DOCUMENTS

| 2010/0265315 | A1 | 10/2010 | Okuda et al. |
| 2012/0162397 | A1 | 6/2012 | Terunuma |
| 2015/0009208 | A1* | 1/2015 | Komoriya .......... H04N 13/0447 345/419 |

FOREIGN PATENT DOCUMENTS

| JP | 5-85223 | 4/1993 |
| JP | 10-96776 | 4/1998 |

(Continued)

OTHER PUBLICATIONS

International Search Report dated Apr. 28, 2015 in International (PCT) Application No. PCT/JP2015/000457.

*Primary Examiner* — Tapas Mazumder
(74) *Attorney, Agent, or Firm* — Wenderoth, Lind & Ponack, L.L.P.

(57) ABSTRACT

An object of the present disclosure is to provide a virtual image display device, a head-up display system and a vehicle which further improve convenience. The virtual image display device according to the present disclosure includes: a display device which outputs a parallax image forming a left eye virtual image and a right eye virtual image, the parallax image having a plurality of regions whose parallax amounts of the left eye virtual image and the right eye virtual image are different; an optical system which displays a virtual image based on the parallax image; and a controller which changes a partition of the plurality of regions of the parallax image according to a situation.

7 Claims, 6 Drawing Sheets

(51) Int. Cl.
    *G06T 7/60* (2017.01)
    *B60K 35/00* (2006.01)
    *H04N 13/04* (2006.01)
    *H04N 13/00* (2018.01)

(52) U.S. Cl.
    CPC ............ *G02B 27/0179* (2013.01); *G06T 7/60* (2013.01); *G06T 19/006* (2013.01); *H04N 13/004* (2013.01); *H04N 13/0022* (2013.01); *H04N 13/04* (2013.01); *H04N 13/044* (2013.01); *B60K 2350/1072* (2013.01); *B60K 2350/2065* (2013.01); *G02B 2027/014* (2013.01); *G02B 2027/0129* (2013.01); *G02B 2027/0134* (2013.01); *G02B 2027/0183* (2013.01); *G06T 2207/20021* (2013.01); *H04N 2013/0088* (2013.01)

(58) Field of Classification Search
    CPC ...... G02B 2027/014; G02B 2027/0183; H04N 13/044; H04N 2013/0088; B60K 2350/1072; B60K 35/00; B60K 2350/2065; G06T 19/006; G06T 7/60
    See application file for complete search history.

(56) References Cited

FOREIGN PATENT DOCUMENTS

| | | |
|---|---|---|
| JP | 2005-301144 | 10/2005 |
| JP | 2007-71579 | 3/2007 |
| JP | 2007-159036 | 6/2007 |
| JP | 2009-31873 | 2/2009 |
| JP | 2010-273333 | 12/2010 |
| JP | 2011-73466 | 4/2011 |
| JP | 2012-141448 | 7/2012 |
| JP | 2012-149950 | 8/2012 |

* cited by examiner

VIRTUAL IMAGE DISPLAY DEVICE, HEAD-UP DISPLAY SYSTEM, AND VEHICLE

BACKGROUND

1. Technical Field

The present disclosure relates to a virtual image display device, a head-up display system which includes the virtual image display device, and a vehicle on which the head-up display system is mounted.

2. Description of Related Art

A head-up display (HUD) superimposes an image in which assist information for assisting driving is drawn, as a virtual image on a foreground of a driver who rides in a vehicle such as a car, and displays the image. Unexamined Japanese Patent Publication No. 2005-301144 discloses a virtual image display device which changes a display distance of a virtual image by changing a parallax amount of a left eye virtual image and a right eye virtual image, having left and right eyes view the virtual images and fusing the virtual images.

SUMMARY

An object of the present disclosure is to provide a virtual image display device, a head-up display system and a vehicle which further improve convenience.

The virtual image display device according to the present disclosure includes: a display device which outputs a parallax image forming a left eye virtual image and a right eye virtual image, the parallax image having a plurality of regions whose parallax amounts of the left eye virtual image and the right eye virtual image are different; an optical system which displays a virtual image based on the parallax image; and a controller which changes a partition of the plurality of regions of the parallax image according to a situation.

The virtual image display device according to the present disclosure can further improve convenience.

DESCRIPTION OF EMBODIMENT

An exemplary embodiment will be described in detail below optionally with reference to the drawings. In this regard, detailed explanation will not be made more than necessary in some cases. For example, detailed explanation of well-known matters and overlapping explanation of substantially same components will not be described in some cases. This is to prevent the following explanation from unnecessarily becoming redundant and facilitate understanding of those skilled in the art.

In addition, the accompanying drawings and the following description are provided to help those skilled in the art sufficiently understand the present disclosure, and do not intend to limit the subject matter recited in the claims.

First Exemplary Embodiment

1. Configuration of Head-Up Display System

Figure 1:
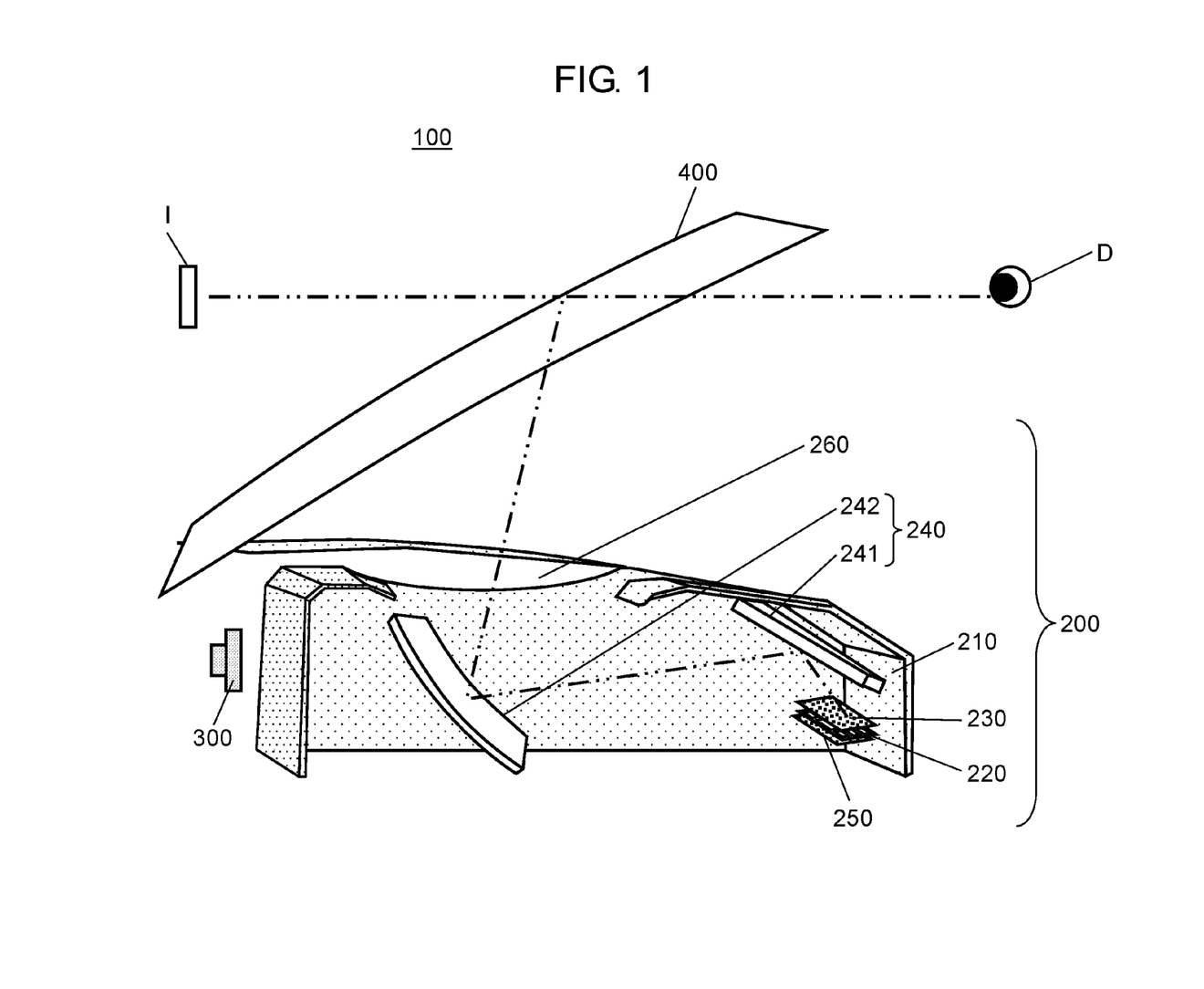
FIG. 1 is a view illustrating a configuration of a head-up display system according to a first exemplary embodiment.

The head-up display system described in the present exemplary embodiment is equipped at, for example, a driver's seat of a car. FIG. 1 is a view illustrating a configuration of head-up display system 100 according to the first exemplary embodiment. Head-up display system 100 has virtual image display device 200, imaging device 300 and wind shield 400. Virtual image display device 200 includes housing 210, and includes display device 220, parallax barriers 230, mirror 240 composed of first mirror 241 and second mirror 242, and controller 250 such as a microcomputer inside housing 210. Further, housing 210 includes aperture 260. Aperture 260 may be covered by a transparent cover.

Virtual image display device 200 is disposed inside a dashboard of a car, for example. Virtual image I is displayed by reflecting at first mirror 241 an image displayed by display device 220, further reflecting the image at second mirror 242, further reflecting the image at wind shield 400 and guiding the image to observer D inside the vehicle.

For display device 220, a liquid crystal display, an organic EL (Electroluminescence) display, or a plasma display is used. Display device 220 displays various pieces of information such as a road guidance, a distance to a front vehicle, a remaining battery of a car and a current car speed. First mirror 241 is provided at an upper part of display device 220 in the vertical direction, and has a reflection plane directed toward a second mirror direction.

In addition, mirror 240 may not be provided, and an image output from display device 220 may be directly projected to wind shield 400 through aperture 260.

Imaging device 300 is a camera which captures an image of a front of a car. Imaging device 300 supplies the captured image to controller 250. Controller 250 detects various pieces of information related to front vehicles by analyzing the supplied captured image. For example, controller 250 detects distances to the front vehicles or sizes of the front vehicles by analyzing the supplied captured image.

In addition, imaging device 300 is used in the present exemplary embodiment. However, the present disclosure is not limited to this. For example, radar may be used to detect distances to front vehicles or sizes of the front vehicles. Alternatively, imaging device 300 and the radar may be used in combination.

Wind shield 400 is a shield which is provided to protect observer D inside the car from a flow of air coming from the front while the car is being driven. Wind shield 400 is made of, for example, glass.

In the present exemplary embodiment, a case where wind shield 400 is used will be described. However, the present disclosure is not limited to this. A combiner may be used instead of wind shield 400.

2. Configuration of Display Device and Parallax Barriers

Figure 2:
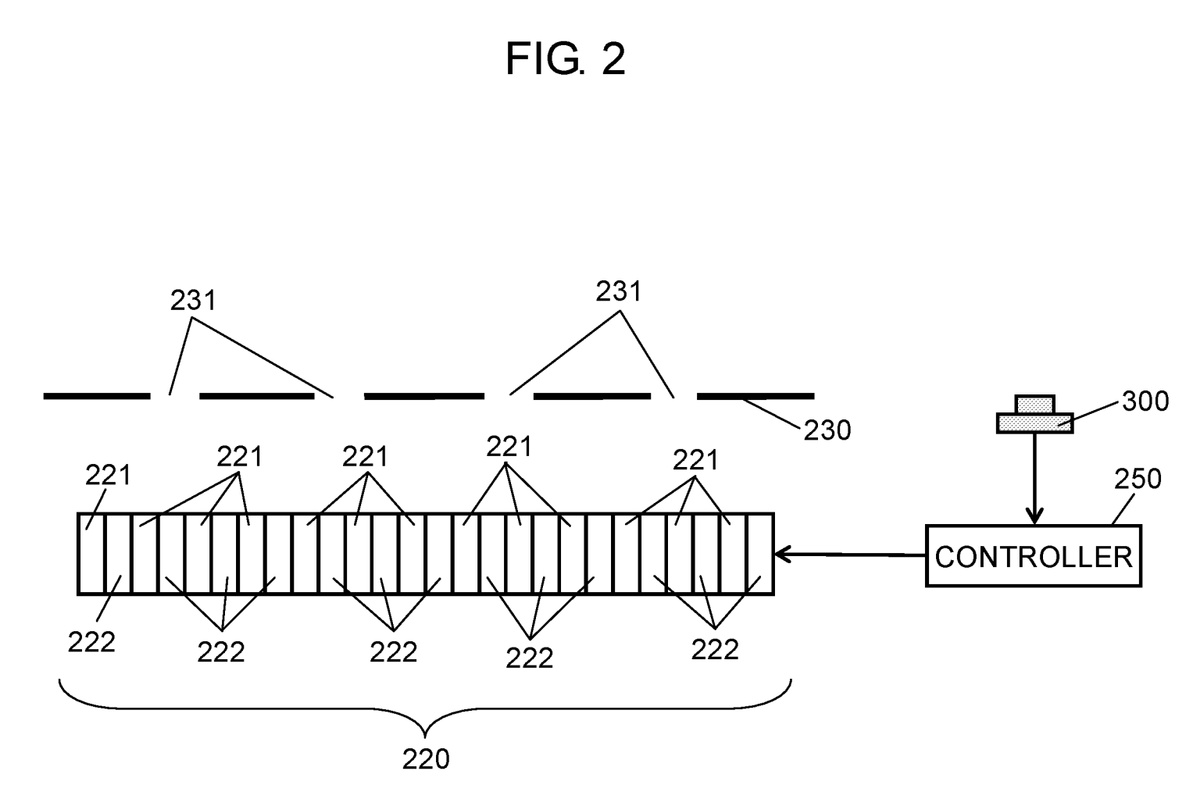
FIG. 2 is a block diagram illustrating a configuration of a display device, parallax barriers, a controller and an imaging device according to the first exemplary embodiment.

Next, the configuration of display device 220 and parallax barriers 230 will be described in detail. FIG. 2 is a block diagram illustrating a configuration of display device 220, parallax barriers 230, controller 250 and imaging device 300. Parallax barriers 230 are formed by depositing a light shielding material such as chrome on a glass substrate which is not illustrated, and one-dimensionally forming the light shielding material in a stripe shape on the glass substrate. Portions at which the light shielding material is not deposited are apertures 231.

Display device 220 includes R (RED), G (Green) and B (Blue) pixels. In the first exemplary embodiment, pixels of display device 220 are spatially divided into left eye pixels 221 and right eye pixels 222. That is, the pixels of display device 220 are alternately allocated as left eye pixels 221 and right eye pixels 222.

Controller 250 detects various pieces of information related to the front vehicles by analyzing an image captured by imaging device 300, and controls a display image of display device 220 based on the detected pieces of information. Display device 220 outputs the display image under control of controller 250.

Parallax barriers 230 include apertures 231 formed at predetermined intervals. Apertures 231 control distribution of light beams emitted from display device 220. Light beams emitted from left eye pixels 221 arrive at the left eye of observer D, and light beams emitted from right eye pixels 222 arrive at the right eye of observer D. Consequently, display device 220 and parallax barriers 230 can present an image having a parallax to observer D.

Figure 3:
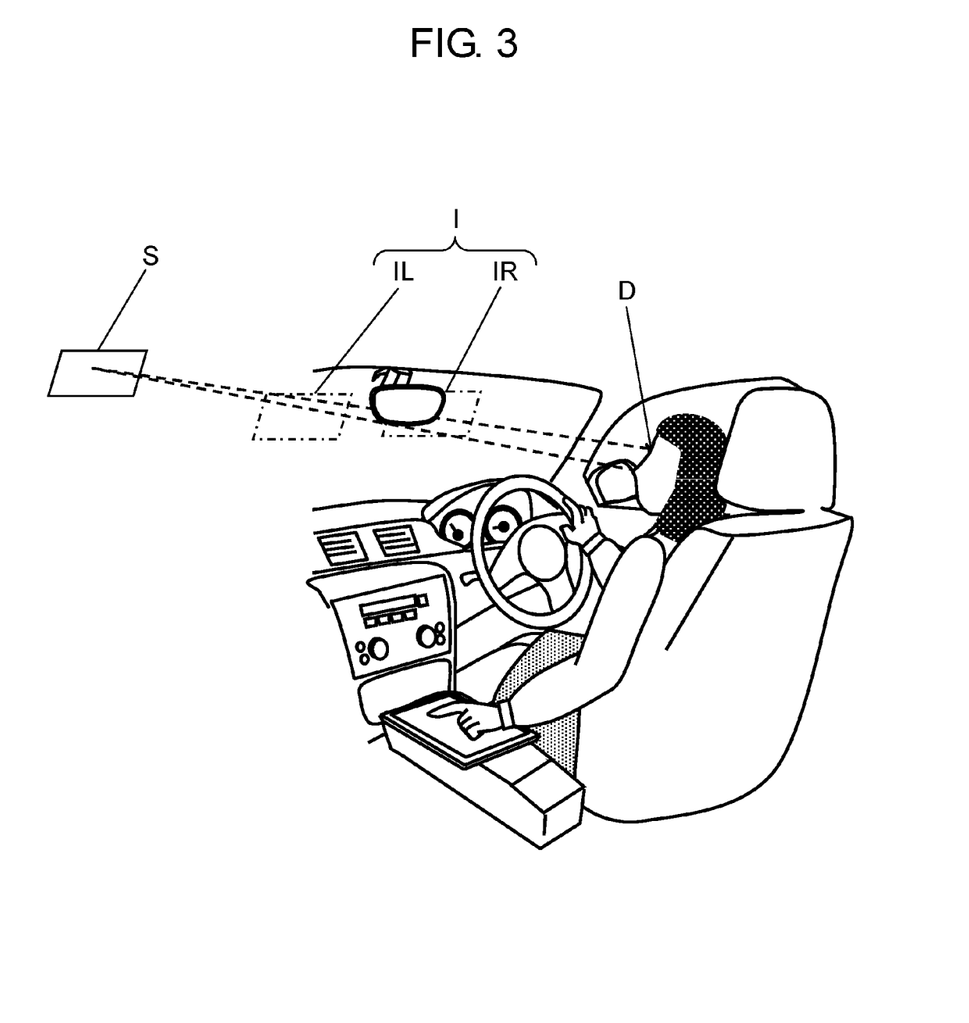
FIG. 3 is a view illustrating a relationship between a left eye image, a right eye image and a stereoscopic image for an observer according to the first exemplary embodiment.

FIG. 3 is a view illustrating a relationship between left eye virtual image IL, right eye virtual image IR and stereoscopic image S for observer D. When observer D uses head-up display system 100, left eye virtual image IL and right eye virtual image IR which are virtual image I of parallax images are displayed at predetermined positions. When viewing left eye virtual image IL and right eye virtual image IR, observer D perceives that stereoscopic image S obtained by stereoscopically viewing and fusing the virtual images is far from the predetermined positions.

In this regard, the predetermined positions at which left eye virtual image IL and right eye virtual image IR which are virtual image I are displayed are defined as "reference virtual image positions".

Next, a relationship between parallax amount Q which is added to a display image of display device 220, and stereoscopic view distance L which is a distance from observer D to a fusion position at which a fused image is perceived is expressed by (Mathematical equation 1).

By changing parallax amount Q of right eye virtual image IR and left eye virtual image IL, controller 250 can change congestion angle θ according to parallax amount Q, and change a stereoscopic view distance of virtual image I which is displayed to observer D.

$$Q = \frac{(L-LI)S}{L}$$ [Mathematical equation 1]

where
Q: Parallax amount of right eye virtual image and left eye virtual image
L: Distance from observer D to fusion position
LI: Distance from observer D to reference virtual image position
S: Interval between right eye and left eye of observer D Controller 250 partitions an image to be displayed into a plurality of regions, and outputs a plurality of regions to display device 220 with different parallax amounts Q per region. Parallax amount Q of each region is calculated based on stereoscopic view distance L (Mathematical equation 1) from observer D to a fusion position per region.

In addition, display device 220 outputs a left eye virtual image and a right eye virtual image by way of spatial division. However, the present disclosure is not limited to this. Display device 220 may output a left eye virtual image and a right eye virtual image by way of time division. In addition, use of parallax barriers 230 has been described above.

However, the present disclosure is not limited to this. Another component such as a lenticular lens or a liquid crystal lens may be used as long as another component can control distribution of light beams projected from display device 220.

3. Operation

Next, the operation of head-up display system 100 will be described. Head-up display system 100 changes a partition of regions of the same parallax amount in an image output from display device 220 according to "situations". There are various "situations", and these situations will be described below.

Figure 4:
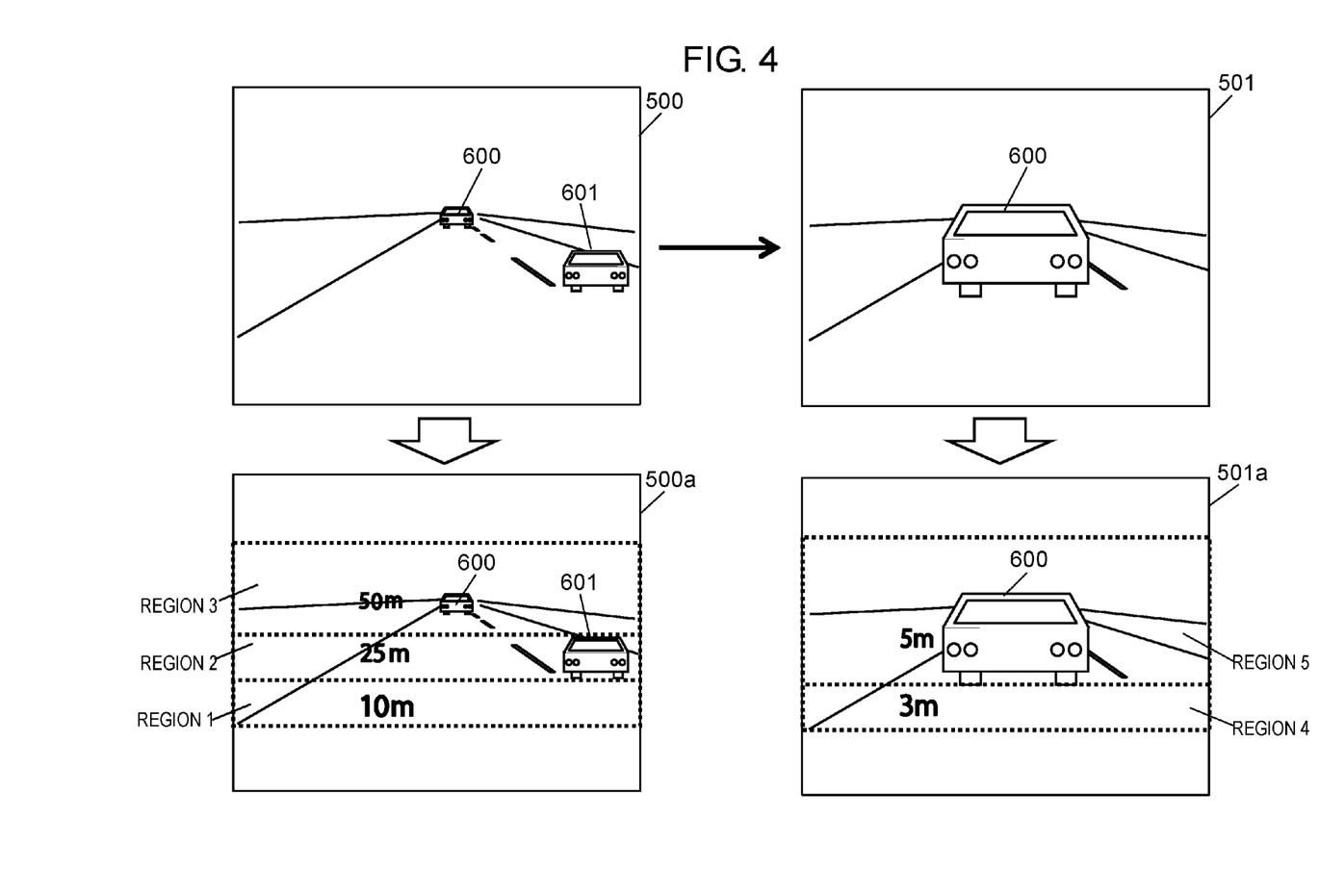
FIG. 4 is a view illustrating a first example where regions are changed according to the first exemplary embodiment.

A case where front vehicles approach from a far distance to a close distance when distances to the front vehicles are displayed will be described as the first example where regions are changed. Head-up display system 100 changes the regions according to the distances to the front vehicles. FIG. 4 is a view for explaining the first example where the regions are changed.

As illustrated in FIG. 4, a foreground of observer D changes from foreground 500 to foreground 501. In foreground 500, vehicles 600 and 601 are confirmed as front vehicles. Imaging device 300 captures an image of foreground 500, and supplies an image of foreground 500 to controller 250. Controller 250 analyzes the supplied image, and detects that a distance to vehicle 600 is 50 m and a distance to vehicle 601 is 25 m. Controller 250 classifies the regions to change a parallax amount of a virtual image which displays foreground 500 according to the distances to the front vehicles. More specifically, virtual image screen 500*a* which displays a stereoscopic image in foreground 500 is horizontally divided into three regions and partitioned as region 1, region 2 and region 3. The distances to the front vehicles become closer in order of region 3, region 2 and region 1. There is vehicle 600 driving 50 m ahead in region 3, there is vehicle 601 driving 25 m ahead in region 2 and there is no vehicle in region 1.

Controller 250 causes the distance "50 m" to vehicle 600 to be displayed on a left side of vehicle 600 in region 3, causes the distance "25 m" to vehicle 601 to be displayed on a left side of vehicle 601 in region 2 and causes the distance "10 m" to be displayed in region 1. Character sizes of the distances to be displayed are displayed larger as the distances become shorter. Controller 250 calculates a parallax amount per region and displays a parallax image in each of region 1 to region 3 of display device 220, and observer D views virtual image screen 500*a*.

Display device 220 displays the parallax image per region. Consequently, observer D can view the parallax images corresponding to the right and left eyes of observer D and stereoscopically view a virtual image. Thus, a parallax between the both eyes allows observer D to perceive a fusion of information indicating a distance at a position corresponding to the distance to a front vehicle. Further, by dividing the virtual image screen into a plurality of regions of the same parallax amount and displaying the regions, it is possible to perceive a fusion corresponding to the parallax amounts of the regions.

Next, it is assumed that the foreground has changed from foreground 500 to foreground 501. In foreground 501, vehicle 600 which is the front vehicle is close compared to foreground 500, and vehicle 601 disappears from the foreground. Imaging device 300 captures an image of foreground 501, and supplies the image to controller 250. Controller 250 analyzes the supplied image, and detects that a distance to vehicle 600 is 5 m. Controller 250 classifies the regions to change a parallax amount of a virtual image which displays foreground 501 according to the distance to the front vehicle. More specifically, virtual image screen 501a which displays a stereoscopic image in foreground 501 is horizontally divided into two regions and partitioned as region 4 and region 5. The distance to the front vehicle becomes closer in order of region 5 and region 4. In region 5, there is vehicle 600 driving 5 m ahead, and there is no vehicle in region 4.

Controller 250 causes the distance "5 m" to vehicle 600 to be displayed on a left side of vehicle 600 in region 5, and causes the distance "3 m" to be displayed in region 4. Character sizes of the distances to be displayed are displayed larger as the distances become shorter. Controller 250 calculates a parallax amount per region and displays a parallax image in each of region 4 to region 5 of display device 220, and observer D views virtual image screen 501a.

When the foreground changes from foreground 500 to foreground 501 as described above, i.e., when a distance to vehicle 600 changes, it is possible to improve visibility of observer D with respect to the foreground by changing a number of regions and sizes of regions.

In addition, distances are displayed in respective regions. However, the present disclosure is not limited to this. That is, in each region, information other than a distance may be displayed. For example, distances may be displayed in regions 1 and 2, and a frame may be displayed around vehicle 600 instead of displaying a distance to emphasize a presence of vehicle 600 ahead. Further, a plurality of items may be displayed in one region. For example, the frame of vehicle 600 and a distance may be displayed in region 3.

Figure 5:
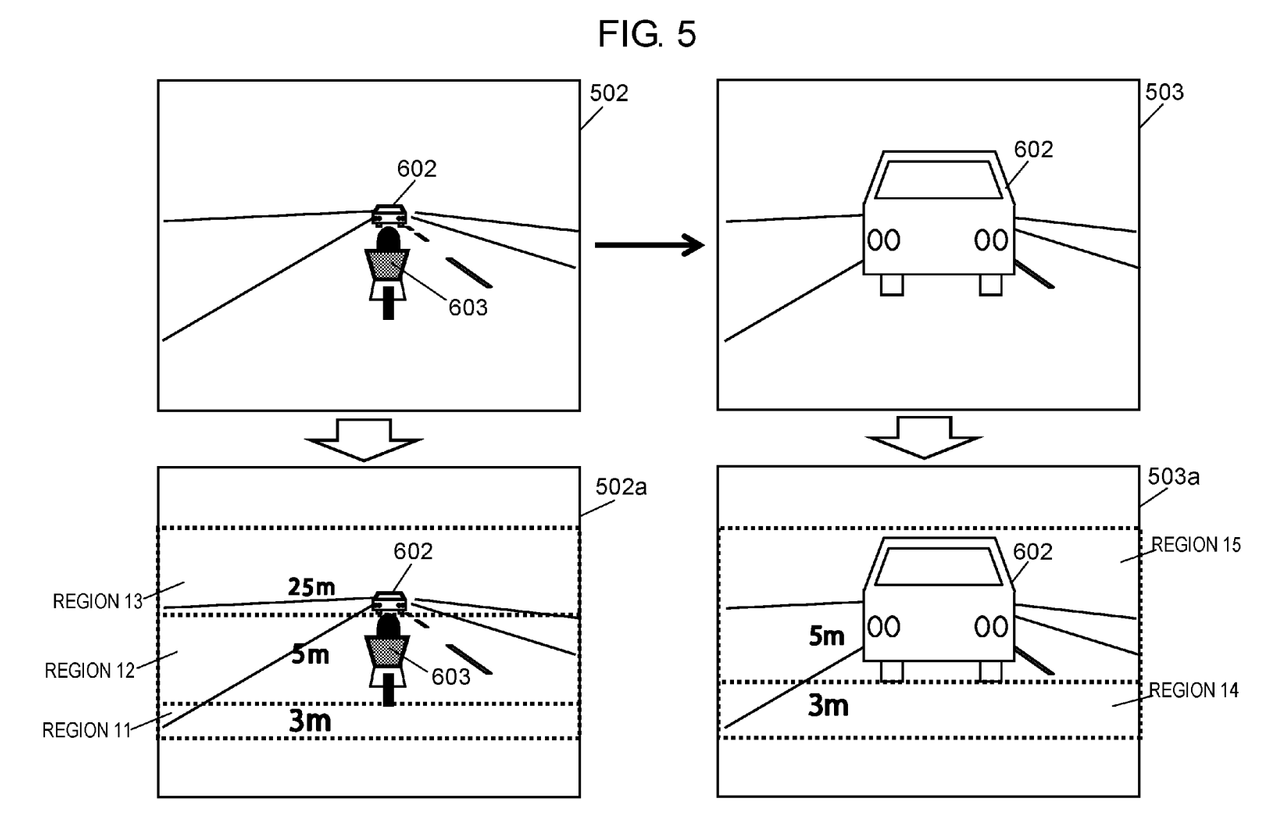
FIG. 5 is a view illustrating a second example where regions are changed according to the first exemplary embodiment.

Next, a case where sizes of regions are changed according to sizes of front vehicles even when distances to the front vehicles are the same will be described as a second example where the regions are changed. FIG. 5 is a view for explaining the second example where the regions are changed.

As illustrated in FIG. 5, a foreground of observer D changes from foreground 502 to foreground 503. In foreground 502, vehicles 602 and 603 are confirmed as front vehicles. Vehicle 602 is a car, and vehicle 603 is a two-wheel vehicle. Imaging device 300 captures an image of foreground 502, and supplies the image to controller 250. Controller 250 analyzes the supplied image, and detects that a distance to vehicle 602 is 25 m and a distance to vehicle 603 is 5 m. Controller 250 classifies the regions to change a parallax amount of a virtual image which displays foreground 502 according to the distances to the front vehicle. More specifically, virtual image screen 502a which displays a stereoscopic image in foreground 502 is horizontally divided into three regions and partitioned as region 11, region 12 and region 13. The distances to the front vehicles become closer in order of region 13, region 12 and region 11. There is vehicle 602 driving 25 m ahead in region 13, there is vehicle 603 driving 5 m ahead in region 12 and there is no vehicle in region 11.

Controller 250 causes the distance "25 m" to vehicle 602 to be displayed on a left side of vehicle 602 in region 13, causes the distance "5 m" to vehicle 603 to be displayed on a left side of vehicle 603 in region 12 and causes the distance "3 m" to be displayed in region 11. Character sizes of the distances to be displayed are displayed larger as the distances become shorter. Controller 250 calculates a parallax amount per region and displays a parallax image in each of region 11 to region 13 of display device 220, and observer D views virtual image screen 502a.

Next, it is assumed that the foreground has changed from foreground 502 to foreground 503. In foreground 503, vehicle 602 which is the front vehicle is close compared to foreground 502 and is at a distance of 5 m, and vehicle 603 disappears from the foreground. The distance to vehicle 603 in foreground 502 and the distance to vehicle 602 in foreground 503 are the same and 5 m. However, the sizes of vehicle 602 and vehicle 603 are different, and therefore the sizes of the regions are changed according to the sizes of vehicle 602 and vehicle 603. Imaging device 300 captures an image of foreground 503, and supplies the image to controller 250. Controller 250 analyzes the supplied image, and detects a distance to vehicle 602. Controller 250 classifies the regions to change a parallax amount of a virtual image which displays foreground 503 according to the distance to the front vehicle. More specifically, virtual image screen 503a which displays a stereoscopic image in foreground 503 is horizontally divided into two regions and partitioned as region 14 and region 15. The distance to the front vehicle becomes closer in order of region 15 and region 14. In region 15, there is vehicle 602 driving 5 m ahead, and there is no vehicle in region 14.

Controller 250 causes the distance "5 m" to vehicle 602 to be displayed on a left side of vehicle 602 in region 15, and causes the distance "3 m" to be displayed in region 14. Character sizes of the distances to be displayed are displayed larger as the distances become shorter. Controller 250 calculates a parallax amount per region and displays a parallax image in each of region 14 to region 15 of display device 220, and observer D views virtual image screen 503a.

Upon comparison of region 12 of virtual image screen 502a and region 15 of virtual image screen 503a, the size of the region differs according to the size of the front vehicle.

As described above, it is possible to improve visibility of observer D with respect to a front vehicle.

In addition, the number of regions is changed from three to two in response to the change of the foreground in FIGS. 4 and 5. However, the present disclosure is not limited to this. For example, the sizes may be changed without changing the number of regions, or the number of regions may not be two or three.

In addition, in FIGS. 4 and 5, the character sizes of the distances to be displayed on the virtual image screen are displayed larger as the distances become closer. However, the present disclosure is not limited to this. Character sizes may be the same irrespective of distances.

In addition, in FIGS. 4 and 5, various pieces of information related to the front vehicles are detected by capturing an image of the front of the car and analyzing the captured image. The present disclosure is not limited to this. For example, the various pieces of information may be any information as long as the information relates to objects which are present ahead.

Figure 6:
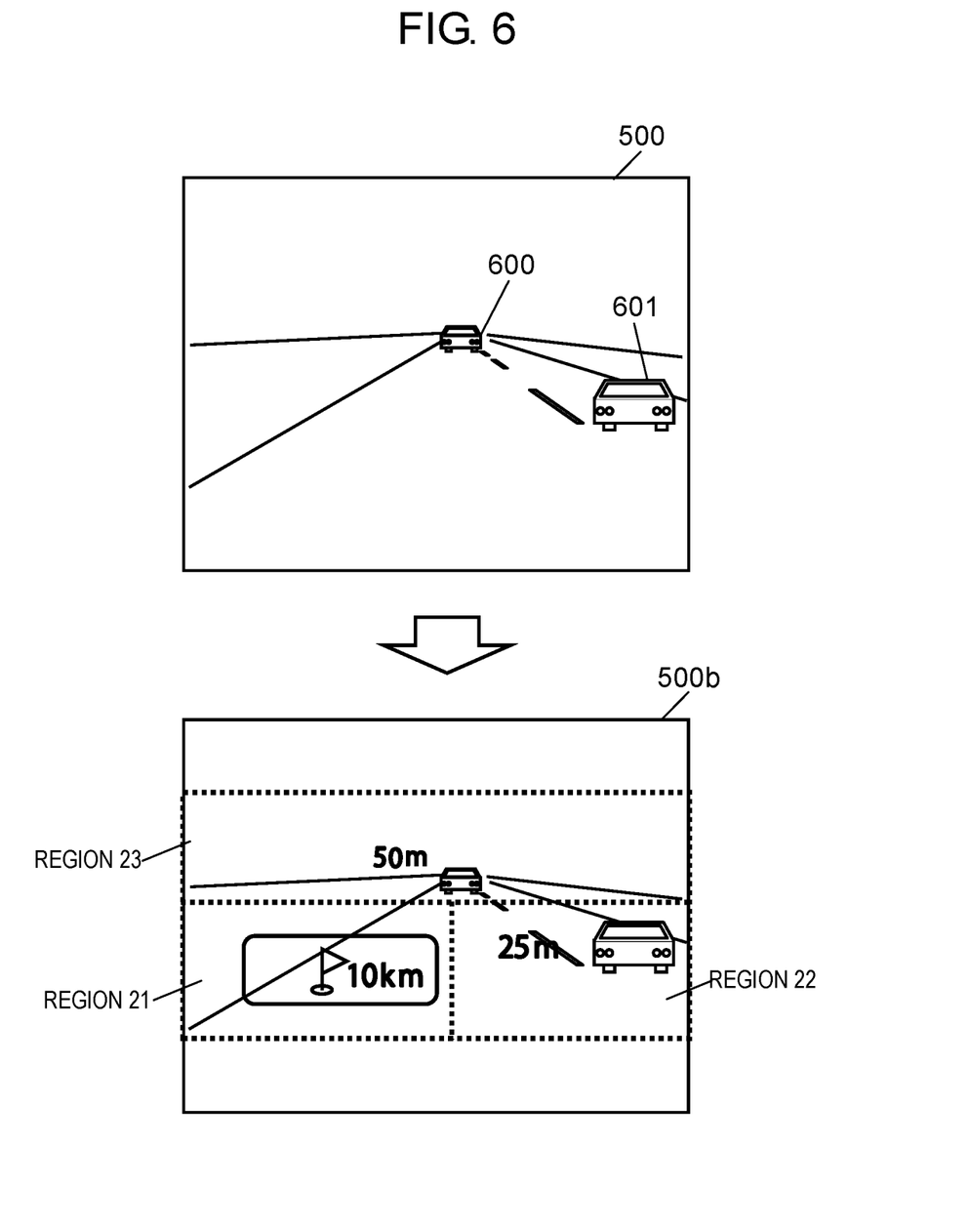
FIG. 6 is a view illustrating a third example where regions are changed according to the first exemplary embodiment.

Next, a case where regions are divided not only horizontally but also vertically will be described as a third example where the regions are changed. FIG. 6 is a view for explaining the third example where the regions are changed.

Another example of display of a stereoscopic image in case where a foreground of observer D is foreground 500 will be described with reference to FIG. 6. In foreground 500, vehicles 600 and 601 are confirmed as front vehicles. Imaging device 300 captures an image of foreground 500, and supplies the image to controller 250. Controller 250 analyzes the supplied image, and detects that a distance to vehicle 600 is 50 m and a distance to vehicle 601 is 25 m. Controller 250 classifies the regions to change a parallax amount of a virtual image which displays foreground 500 according to the distances to the front vehicles. More specifically, virtual image screen 500b which displays a virtual image in foreground 500 is horizontally divided into three regions and partitioned as region 21, region 22 and region 23. The distances to the front vehicles become closer in order of region 23, region 22 and region 21. There is vehicle 600 driving 50 m ahead in region 23, there is vehicle 601 driving 25 m ahead in region 22 and there is no vehicle in region 21. A difference from virtual image screen 500a described with reference to FIG. 4 is that the regions are divided not only horizontally but also vertically.

Controller 250 causes the distance "50 m" to vehicle 600 to be displayed on a left side of vehicle 600 in region 23, causes the distance "25 m" to vehicle 601 to be displayed on a left side of vehicle 601 in region 22 and causes a distance "10 km" to a destination to be displayed as a road guidance in region 21. Character sizes of the distances to be displayed are displayed larger as the distances become shorter. Controller 250 calculates a parallax amount per region and displays a parallax image in each of region 21 to region 23 of display device 220, and observer D views virtual image screen 500b.

As described above, it is possible to improve visibility of observer D with respect to a front vehicle.

The virtual image display device and the head-up display system which includes the virtual image display device according to the present disclosure are applicable not only for use in vehicles such as cars but also for use in pilots' seats of airplanes and ships, and simulation systems such as game machines which allow users to virtually experience operations.

The invention claimed is:

1. A virtual image display device comprising:
   a display device which outputs a parallax image forming a left eye virtual image and a right eye virtual image, the parallax image having a plurality of regions whose parallax amounts of the left eye virtual image and the right eye virtual image are different;
   an optical system which displays a virtual image based on the parallax image; and
   a controller which changes a partition of the plurality of regions of the parallax image depending on a situation.

2. The virtual image display device according to claim 1, further comprising a detector which detects a front object,
   wherein the controller changes the partition of the plurality of regions depending on a distance to the front object.

3. The virtual image display device according to claim 2, wherein the parallax image is information related to the distance.

4. The virtual image display device according to claim 1, further comprising a detector which detects a front object,
   wherein the controller changes the partition of the plurality of regions depending on a size of the front object.

5. The virtual image display device according to claim 1, wherein the controller partitions an area of the parallax image having a substantially same parallax amount into a first region and a second region according to the situation.

6. A head-up display system comprising the virtual display device according to claim 1.

7. The head-up display system according to claim 6, wherein the head-up display system is mounted on a vehicle.

* * * * *